2,032,169

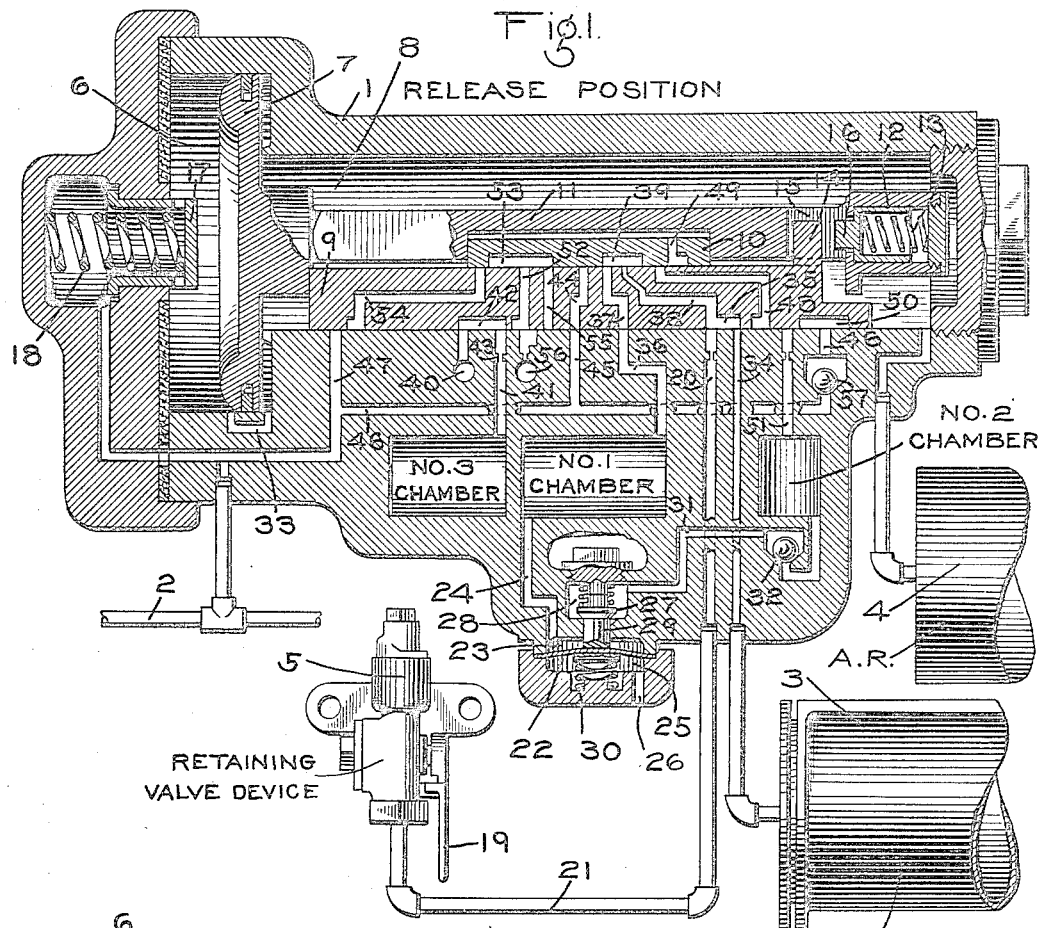
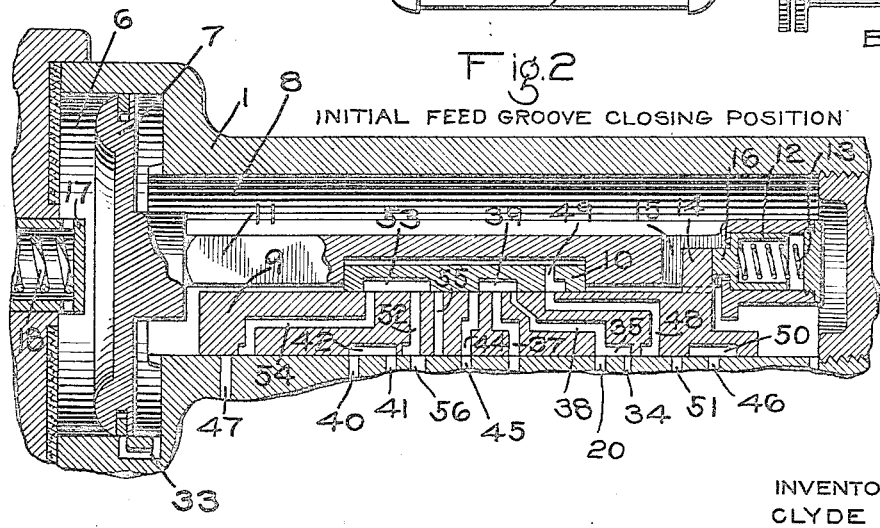

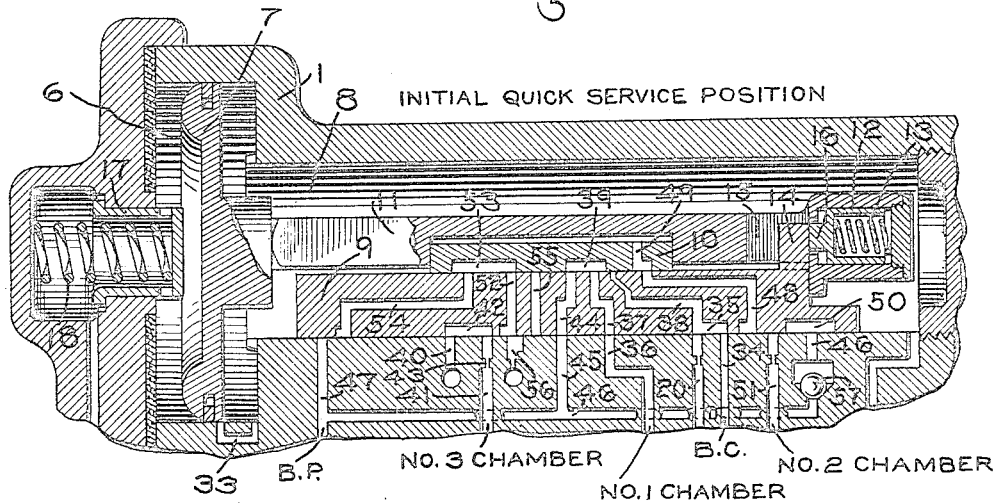
Fig. 3 — INITIAL QUICK SERVICE POSITION
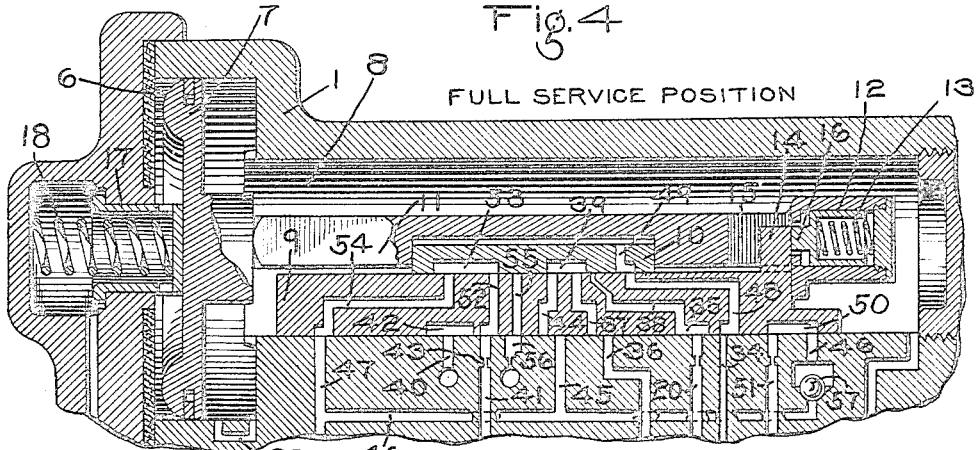
Fig. 4 — FULL SERVICE POSITION
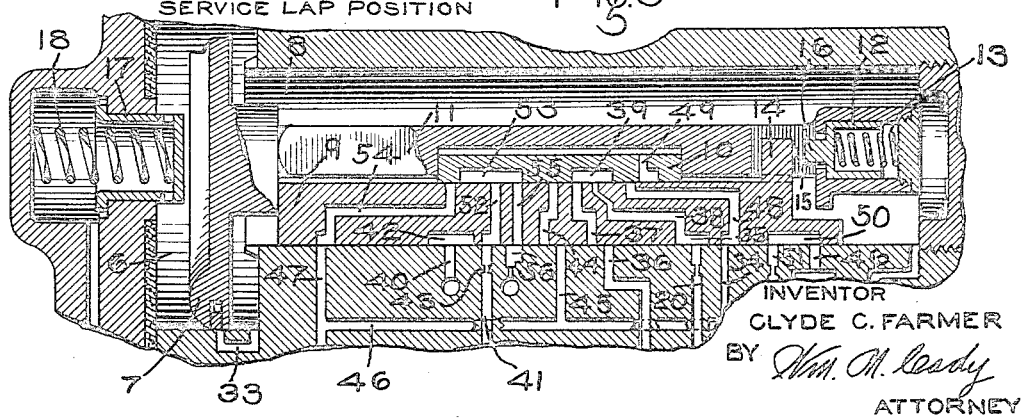
Fig. 5 — SERVICE LAP POSITION
INVENTOR
CLYDE C. FARMER
BY Wm. M. Cady
ATTORNEY Patented Feb. 25, 1936

UNITED STATES PATENT OFFICE 2,032,169

TRIPLE VALVE DEVICE

Clyde C. Farmer, Pittsburgh, Pa., assignor to The Westinghouse Air Brake Company, Wilmerding, Pa., a corporation of Pennsylvania Application August 6, 1930, Serial No. 473,323

27 Claims. (Cl. 303—38)

This invention relates to fluid pressure brakes, and more particularly to the well known automatic fluid pressure brake system, in which the brakes are applied by effecting a reduction in brake pipe pressure and are released by effecting an increase in brake pipe pressure.

With the increase in train lengths, the difficulty of applying and releasing the brakes without causing excessive shocks has correspondingly increased, due to the running in of the slack before the brakes are applied on the rear cars of the train, and the running out of the slack before the brakes are released on the rear cars.

In actual service, difficulty is encountered in causing all brakes to apply on long trains, because of the slow rate of brake pipe reduction, due to the length of the brake pipe, and to the auxiliary reservoir of the brake equipment discharging fluid into the brake pipe through the feed groves, and due to the fact that the brakes apply slowly because of increased brake pipe air to be discharged at brake valve, so that excessively heavy reductions in brake pipe pressure must be made to ensure that all brakes will apply, especially when the brake pipe leakage is of a minimum amount. Consequently, shocks are produced, not only because of the slow serial application of the brakes, but also because the brakes apply non-uniformly in degree of brake force.

The principal object of my invention is to provide a brake equipment by which the brakes can be applied on a long train with certainty and without causing excessive shocks.

According to one feature of my invention, the venting of fluid under pressure from the brake pipe to effect a quick serial action (commonly known as quick service) in a service application of the brakes is effected, by the triple valve device or similar brake controlling valve device, in advance of the movement of the main slide valve to service application position, and upon a light but predetermined and definite reduction in brake pipe pressure such as a one pound reduction in brake pipe pressure.

According to my improvement, the triple valve piston first moves the graduating valve to close the feed groove, resisted only by the normal friction of the piston and graduating valve, and then, after a further movement of the graduating valve by the triple valve piston, upon a predetermined reduction in brake pipe pressure, a local venting of fluid from the brake pipe is effected, without moving the main slide valve of the triple valve device, thus causing similar quick serial service operation of all the triple valve devices throughout the train, each in advance of the application of the brakes on that car.

As a result, a limited and sharp brake pipe reduction is rapidly transmitted throughout the train, which causes the triple valve pistons to first positively close the feed grooves, before any appreciable back flow from the auxiliary reservoir to the brake pipe can occur, and then the triple valve pistons move out to service application position, thus initiating an application of the brakes.

When the triple valve piston and slide valves are in service application position, a further reduction in brake pipe pressure is effected which is sufficient to insure the triple valve piston and consequently the slide valves remaining in a position to supply fluid under pressure to the brake cylinder so that an effective brake cylinder pressure will be developed. The rate at which this quick service reduction in brake pipe pressure is effected in service position is relatively slow so as to dampen or smooth out any surges of fluid in the brake pipe which may have been caused upon effecting the initial local reduction in brake pipe pressure.

In addition to the above quick service action, means are included for securing a limited quick service action upon successive reductions in brake pipe pressure. This secondary quick service action or reduction in brake pipe pressure is proportional to the degree of the service application movement and period of time which the triple valve parts remain in service and service lap positions.

Another object of my invention is to prevent the excessive build up of brake cylinder pressure when the brakes are reapplied in cycling on descending grades, when the brake cylinder pressure retaining valve is cut in to retain pressure in the brake cylinder. According to my invention, means are provided which operates, upon a reapplication of the brakes, when pressure is retained in the brake cylinder, to reduce the extent of quick service venting of fluid from the brake pipe as compared with an initial quick service reduction made when the brakes are completely released.

In the accompanying drawings; Fig. 1 is a diagrammatic sectional view of a fluid pressure brake equipment embodying my invention and showing the triple valve device in release position; Fig. 2 a fragmentary sectional view of the triple valve device, showing the parts as positioned upon initial movement of the triple valve piston to effect the closure of the feed port; Fig. 3 a fragmentary sectional view of the triple valve device, showing the parts in the initial quick service position; Fig. 4 a fragmentary sectional view of the triple valve device, showing the parts in second quick service and service application position; and Fig. 5 a fragmentary sectional view of the triple valve device, showing the parts in service lap position.

As shown in Fig. 1 of the drawings, the fluid pressure brake equipment may comprise a triple valve device 1, a brake pipe 2, a brake cylinder 3, an auxiliary reservoir 4, and a brake cylinder pressure retaining valve device 5.

The triple valve device 1 comprises a casing having a piston chamber 6, connected to the brake pipe 2, and containing a piston 7, and having a valve chamber 8, connected to the auxiliary reservoir 4 and containing a main slide valve 9, and a graduating slide valve 10, mounted on and having a movement relative to the main slide valve, said valves being operated by said piston through a piston stem 11.

Carried by said stem at its rear end is a movable member 12, subject to the pressure of a coil spring 13. A flange 14 is carried by the main valve 9 at its rear end and extends upwardly into a slot 15 in the stem 11. The flange 14 is so positioned that upon forward movement of the stem 11, a projecting portion 16 of the member 12 engages said flange. It will however be noted that, with the triple valve parts in release position as shown in Fig. 1, there is a space between the end of the projecting portion 16 of the member 12 and the rear surface of the flange 14 which in effecting an application of the brakes provides for a certain movement of the graduating valve relative to the main valve prior to the projecting portion engaging the flange 14. With the triple valve parts in service lap position, as shown in Fig. 5, the same space is provided between the projection 16 and the rear surface of the flange 14 as when the triple valve parts are in release position which in effecting a reapplication of the brakes provides for movement of the graduating valve relative to the main valve prior to the projection 16 engaging the flange 14.

Upon movement of the piston 7 to full service position, it engages a movable stop member 17, subject to the pressure of a coil spring 18.

The brake cylinder pressure retaining valve device 5 may be of the well known type having a controlling handle 19 which may be set in one position, so that the brake cylinder exhaust from the triple valve device through passage 20 and pipe 21 is connected to the atmosphere, and which may be set to another position, in which a predetermined degree of pressure is retained in the brake cylinder.

In the triple valve casing are provided chambers which will hereinafter be referred to as No. 1 chamber, No. 2 chamber, and No. 3 chamber, respectively, and into which chambers, under certain conditions, fluid under pressure is vented from the brake pipe.

Shown diagrammatically, for convenience, as incorporated in the triple valve casing, is a valve device comprising a flexible diaphragm 22 having the chamber 23 at one side connected through a passage 24 with the No. 1 chamber and the chamber 25 at the opposite side connected to the atmosphere through a port 26. A valve 27, mounted in a valve chamber 28, is provided with a stem 29 adapted to engage the diaphragm 22, and a spring 30 acts on the diaphragm in a direction urging the valve from its seat.

The valve chamber 28 is connected to a passage 31, containing a ball check valve 32, and leading to the No. 2 chamber. When the valve 27 is unseated, communication is established from the No. 2 chamber to the No. 1 chamber, through passage 31, valve chamber 28, chamber 23, and passage 24.

In the release position of the triple valve parts, as shown in Fig. 1, a feed passage 33, around the triple valve piston 7 permits the supply of fluid under pressure from the piston chamber 6 and the brake pipe 2 to the valve chamber 8 and the auxiliary reservoir 4, so that the auxiliary reservoir is charged with fluid under pressure in the usual manner, when the brake pipe is charged through the operation of the engineer's brake valve on the locomotive (not shown).

In this position, passage 34, leading to the brake cylinder 3, is connected to passage 20 through a cavity 35 in main slide valve 9, so that the brake cylinder is open either directly to the atmosphere, or pressure is retained by operation of the retaining valve device 5, according to the position of the handle 19.

The No. 1 chamber is connected to passage 20 and also to the brake cylinder through passage 36, port 37, cavity 39 in graduating valve 10, and port 38, which opens into cavity 35. The No. 3 chamber is connected to an atmospheric exhaust port 40, through passage 41, and cavity 42 in the main slide valve 9, the passage 41 having a restricted portion 43, so that in release position, the No. 1 and No. 3 chambers are maintained at atmospheric pressure.

The No. 2 chamber is at atmospheric pressure when the brakes are completely released, since said chamber is normally connected to the No. 1 chamber, through passage 31 and passage 24, the valve 27 being normally held open by the spring 30 acting on diaphragm 22.

Upon a reduction in brake pipe pressure to effect an application of the brakes, the piston 7 moves at a slight differential in pressure between the auxiliary reservoir and the brake pipe, (less than one pound), so as to close the feed port 33 and prevent back flow from the auxiliary reservoir to the brake pipe.

The piston 7 moves the graduating valve 10 relatively to the main valve 9 until the projection 16 engages the flange 14, as shown in Fig. 2. During this movement of the graduating valve 10 relative to the main valve 9, the service port 49 in the auxiliary valve is brought into registration with the service port 48 in the main slide valve. Further movement of the piston is then resisted by the pressure of spring 13, but when the brake pipe pressure is reduced a predetermined but light amount, for example, a reduction of one pound, the spring 13 is such that its resistance is overcome, permitting the piston to move the graduating valve 10 to the initial quick service position, as shown in Fig. 3, without moving the main slide valve 9.

In this position, cavity 39 in the graduating valve connects port 37 with a port 44, and the service port 49 in the graduating valve, due to its having a toe cavity, remains in communication with the service port 48 in the main valve.

The port 44 registers in the release position of main valve 9 with a passage 45, which connects with the brake pipe, through passages 46 and 47. Fluid under pressure is then vented from the brake pipe to the No. 1 chamber, so as to produce a sharp and definite local reduction in brake pipe pressure, before the triple valve parts move to service application position. This local reduction is rapidly transmitted to the next car of the train, causing the triple valve on said next car to act in a similar manner, and so on throughout the length of the train. As a consequence, quick serial service action takes place on each car in advance of the application of the brakes on that car.

Following the above described quick service venting of fluid from the brake pipe, the triple valve piston and main slide valve are positively moved to service application position on each car, in which position, as shown in Fig. 4, passage 34 is connected to port 48 in main slide valve 9, and port 49 in the graduating valve 10 being in registry with port 48, fluid under pressure is supplied from the auxiliary reservoir to the brake cylinder to effect a service application of the brakes in the usual manner.

The movement of the main slide valve 9 toward service position operates to cut off communication between the passages 36 and 45, so that further venting of fluid from the brake pipe to the No. 1 chamber is cut off. The movement of the main slide valve to service position, however, causes the cavity 50 to connect passage 51, leading to the No. 2 chamber to brake pipe passage 46, so that fluid is now vented from the brake pipe to, and equalizes into the No. 2 chamber.

In service application position, a further venting of fluid from the brake pipe to the No. 3 chamber takes place, since passage 41 is connected to brake pipe passage 47 by way of port 52 in the main slide valve 9, cavity 53 in the graduating valve 10, and port 54 in the main slide valve. This venting is proportional to the time that the graduating valve 10 remains in service application position.

When the triple valve device is in service application position the venting of fluid will be at a relatively slow rate by way of the restricted passages 41 and 51 so as to smooth out surges in the fluid in the brake pipe.

The total reduction in brake pipe pressure resulting from the above described quick service action is sufficient to produce a desired and effective brake cylinder pressure, such as, for example, a brake cylinder pressure of 7 to 8 pounds.

When the auxiliary reservoir pressure has been reduced by flow to the brake cylinder to a degree slightly less than the reduced brake pipe pressure, the piston 7 moves the graduating valve 10 back to service lap position, in which the supply of fluid to the brake cylinder is cut off and in which communication from the brake pipe to the No. 3 chamber is cut off. In service lap position, as shown in Fig. 5, the cavity 53 in the graduating valve connects port 52 with a port 55 in the main slide valve, which port registers with an atmospheric exhaust port 56. Fluid is thus vented from the No. 3 chamber to the atmosphere for the period of time the graduating valve remains in service lap position, and in a succeeding brake pipe reduction, the amount of reduction in brake pipe pressure will therefore depend upon the time the triple valve parts remain in service and service lap positions in the previous brake pipe reduction.

When the graduating valve is in service lap position and a succeeding brake pipe reduction is effected, as above mentioned, to effect an increase in brake cylinder pressure, the piston 7 will be caused to operate to shift the graduating valve again to its full service position as shown in Fig. 4. Due to the space between the end of the projection 16 of the member 12 and the rear surface of the flange 14 on the main valve, the piston and graduating valve will move a sufficient distance, without opposition by the action of the spring 13 and member 12 to bring the service port 49 in the graduating valve into registration with the service port 48 in the main valve. It will thus be seen that the movement of the piston and graduating valve from service lap position to a position for again supplying fluid under pressure to the brake cylinder is resisted only by the normal friction of the piston and graduating valve.

Upon increasing the brake pipe pressure to effect the release of the brakes, the triple valve piston 7 is operated to shift the graduating valve 10 and the main slide valve 9 back to release position, as shown in Fig. 1. In this position, if a full release of the brakes is desired, the retaining valve handle 19 is set to the direct release position, in which passage 20 is connected to the atmosphere.

The brake cylinder 3 and the No. 1 chamber are thus vented to the atmosphere, as well as the No. 2 chamber, by way of passages 31 and 24.

If it is desired to retain pressure in the brake cylinder as when operating upon a descending grade, the retaining valve handle 19 is turned to its position in which the retaining valve device 5 operates to retain a predetermined pressure in the brake cylinder. In this case, when the brake pipe pressure is increased and the triple valve parts are moved to release position, a predetermined degree of pressure is retained in the brake cylinder and also in the No. 1 chamber. The fluid pressure supplied from the brake pipe to No. 1 chamber acts on the diaphragm 22 and deflects same against the pressure of spring 39, so that valve 27 is allowed to seat, and since the diaphragm remains deflected when pressure is retained in the brake cylinder by operation of the retaining valve, fluid from the No. 2 chamber cannot flow back to the No. 1 chamber in the release position of the triple valve parts. As a consequence, upon a successive reduction in brake pipe pressure, fluid will not be vented from the brake pipe to the No. 2 chamber and further, the extent of reduction in brake pipe pressure by flow to the No. 1 chamber will be reduced, since the No. 1 chamber contains fluid at the pressure retained in the brake cylinder.

This prevents an excessive brake application upon a reapplication of the brakes such as would be the case, if the brake pipe pressure should be reduced by venting to the No. 2 chamber, since in the reapplication of the brakes, the auxiliary reservoir must equalize into a brake cylinder volume containing fluid at the pressure retained in the brake cylinder.

In order to prevent back flow from the No. 2 chamber to the brake pipe, when the brake pipe pressure is less than the pressure at which the brake pipe equalizes into the chamber No. 2, a ball check valve 57 is disposed in the passage 46, so that fluid under pressure cannot flow from said chamber to the brake pipe.

The No. 1 chamber is preferably of relatively large volume, so that if the main slide valve 9 should fail to move promptly, the brake pipe pressure will be further reduced by flow to said chamber up to the point where the brake pipe pressure equalizes with the pressure in chamber No. 1.

It will here be understood that in effecting a service application of the brakes, the piston 7 and slide valves 9 and 11 instead of coming to a stop in the position shown in Fig. 4 may continue to move outwardly against the opposing pressure of the spring 18 until the piston is in sealing engagement with a gasket or packing ring mounted in the triple valve casing. In this position, the communications established by the valves 9 and 11 in full service position will be maintained.

One of the functions of the graduating spring 18 is to move the piston 7 from engagement with the usual packing ring to the position shown in Fig. 4, so that the full area of the piston 7 will be exposed to brake pipe pressure when it is desired to release the brakes.

Since the spring 13 acts in the same direction, it may serve the purpose of the graduating spring 18, if desired, so that the graduating spring may then be dispensed with.

The subject matter relating to the quick service venting of fluid from the brake pipe as well as that relating to the triple valve stabilizing mechanism is broadly claimed in my pending application, Serial No. 612,465, filed May 20, 1932, which application is in part a continuation of the present application.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, auxiliary reservoir, and brake cylinder, of a triple valve device comprising a main valve, a graduating valve having a movement relative to the main valve, and a piston operated upon a reduction in brake pipe pressure for actuating said valves to effect the supply of fluid from the auxiliary reservoir to the brake cylinder to cause a service application of the brakes, two chambers of constant volumes and separate from the brake cylinder, means operative upon movement of said graduating valve relative to the main valve for venting fluid under pressure from the brake pipe to one of said chambers, and means operative upon movement of said valves to service application position for venting fluid under pressure from the brake pipe to the other of said chambers.

2. In a fluid pressure brake, the combination with a brake pipe and a triple valve device comprising valve means, and a piston operated upon a reduction in brake pipe pressure for operating said valve means, of two chambers, means operative upon movement of said valve means for first venting fluid under pressure from the brake pipe to one chamber and then upon a further movement of said valve means for venting fluid from the brake pipe to the other chamber, and a passage connecting said chambers.

3. In a fluid pressure brake, the combination with a brake pipe and a triple valve device comprising valve means, and a piston operated upon a reduction in brake pipe pressure for operating said valve means, of two chambers, means operative upon movement of said valve means for first venting fluid under pressure from the brake pipe to one chamber and then upon a further movement of said valve means for venting fluid from the brake pipe to the other chamber, and a passage permitting the flow of fluid from the last mentioned chamber to the first.

4. In a fluid pressure brake, the combination with a brake pipe and a triple valve device comprising valve means, and a piston operated upon a reduction in brake pipe pressure for operating said valve means, of two chambers, means operative upon movement of said valve means for first venting fluid under pressure from the brake pipe to one chamber and then upon a further movement of said valve means for venting fluid from the brake pipe to the other chamber, a passage connecting said chambers, and a check valve for preventing back flow from the first mentioned chamber to the last.

5. In a fluid pressure brake, the combination with a brake pipe and a triple valve device comprising a main valve, a graduating valve having a movement relative to the main valve, and a piston operated upon a reduction in brake pipe pressure for actuating said valves to effect an application of the brakes, of two chambers, means for venting fluid under pressure from the brake pipe to one chamber upon movement of the graduating valve, means for venting fluid under pressure from the brake pipe to the second chamber upon movement of the main valve, and a passage through which fluid can flow from the second chamber to the first.

6. In a fluid pressure brake, the combination with a brake pipe and a triple valve device comprising a main valve, a graduating valve having a movement relative to the main valve, and a piston operated upon a reduction in brake pipe pressure for actuating said valves to effect an application of the brakes, of a chamber open to the atmosphere in the release position of said main valve, means operative upon movement of said graduating valve for venting fluid under pressure from the brake pipe to said chamber, a second chamber, means for venting fluid under pressure from the brake pipe to the second chamber upon movement of the main valve, and a passage connecting said chambers and permitting the venting of fluid from the second chamber to the first.

7. In a fluid pressure brake, the combination with a brake pipe, brake cylinder, and a triple valve device comprising a main valve, a graduating valve having a movement relative to the main valve, and a piston operated upon a reduction in brake pipe pressure for moving said valves to service position in which fluid under pressure is supplied to the brake cylinder, of a chamber of constant volume and separate from the brake cylinder, means operative upon movement of the graduating valve relative to the main valve for venting fluid under pressure from the brake pipe to said chamber, a second chamber of constant volume and separate from the brake cylinder, and means operative in the service application position of said valves for venting fluid from the brake pipe to said second chamber.

8. In a fluid pressure brake, the combination with a brake pipe, brake cylinder, and a triple valve device comprising a main valve, a graduating valve having a movement relative to the main valve, and a piston operated upon a reduction in brake pipe pressure for moving said valves to service position in which fluid under pressure is supplied to the brake cylinder, of a chamber, means operative upon movement of the graduating valve relative to the main valve for venting fluid under pressure from the brake pipe to said chamber, a second chamber, means operative upon movement of the main valve for venting fluid under pressure from the brake pipe to said second chamber, a third chamber, and means operative upon movement of said valves to service application position for venting fluid from the brake pipe to said third chamber.

9. In a fluid pressure brake, the combination with a brake pipe and a triple valve device comprising valve means and a piston operated upon a reduction in brake pipe pressure for actuating said valve means to effect an application of the brakes, of a chamber, means operative upon movement of said valve means to effect an application of the brakes, to vent fluid under pressure from the brake pipe to said chamber, and upon movement of said valve means to release position for venting fluid from said chamber, and a valve device operated by an increase in fluid pressure for cutting off communication through which fluid is vented from said chamber.

10. In a fluid pressure brake, the combination with a brake pipe, brake cylinder, and a triple valve device comprising valve means and a piston operated upon a reduction in brake pipe pressure for actuating said valve means to apply fluid under pressure to the brake cylinder and upon an increase in brake pipe pressure for releasing fluid from the brake cylinder, of a valve device for retaining fluid under pressure in the brake cylinder upon movement of the triple valve device to release position, a chamber, means operative upon movement of said valve means to apply the brakes for venting fluid from the brake pipe to said chamber and upon movement of said valve means to release the brakes for venting fluid from said chamber, and a valve device operated by pressure retained in the brake cylinder for cutting off communication through which fluid is vented from said chamber.

11. In a fluid pressure brake, the combination with a brake pipe and a triple valve device comprising a main valve, a graduating valve having a movement relative to the main valve, and a piston operated upon a reduction in brake pipe pressure for actuating said valves to effect an application of the brakes, of a chamber, means operative upon movement of said graduating valve in applying the brakes for venting fluid from the brake pipe to said chamber, a second chamber, means operative upon movement of the main valve in applying the brakes for venting fluid from the brake pipe to said second chamber, a passage connecting the first chamber with the second chamber, and valve means operated by an increase in pressure in the first chamber for cutting off communicaiton through said passage from the second chamber to the first.

12. In a fluid pressure brake, the combination with a brake pipe, a brake cylinder, and a triple valve device operated upon a reduction in brake pipe pressure for supplying fluid under pressure to the brake cylinder and upon an increase in brake pipe pressure for releasing fluid from the brake cylinder, of a retaining valve device for controlling the exhaust of fluid from the brake cylinder and having one position for retaining fluid in the brake cylinder in releasing the brakes, and another position for permitting the full release of fluid from the brake cylinder, a chamber connected to said retaining valve in the release position of said triple valve device and into which fluid is vented from the brake pipe in applying the brakes, a second chamber into which fluid is vented from the brake pipe in applying the brakes, a passage connecting said chambers, through which fluid is vented from the second chamber to the first, and means operated by pressure retained in the first chamber for cutting off communication through said passage from the second chamber to the first.

13. In a fluid pressure brake, the combination with a brake pipe, a brake cylinder, and a triple valve device operated upon a reduction in brake pipe pressure for supplying fluid under pressure to the brake cylinder and operated upon an increase in brake pipe pressure for releasing fluid under pressure from the brake cylinder, of a retaining valve device for controlling the exhaust of fluid under pressure from the brake cylinder and having one position for retaining fluid in the brake cylinder in releasing the brakes, and having another position for permitting the full release of fluid under pressure from the brake cylinder, a plurality of connected chambers into which fluid under pressure is vented in applying the brakes, and means operative to vent fluid under pressure from both of said chambers in releasing the brakes when the pressure retaining valve device is in position to permit the full release of fluid under pressure from the brake cylinder and operative when the pressure retaining valve device is in pressure retaining position to close off back flow of fluid from one of said chambers to the other.

14. In a fluid pressure brake, the combination with a brake pipe, a brake cylinder, and a triple valve device operated upon a reduction in brake pipe pressure for supplying fluid under pressure to the brake cylinder and operated upon an increase in brake pipe pressure for releasing fluid under pressure from the brake cylinder, of a retaining valve device for controlling the exhaust of fluid under pressure from the brake cylinder and having one position for retaining fluid in the brake cylinder in releasing the brakes, and having another position for permitting the full release of fluid under pressure from the brake cylinder, a plurality of connected chambers into which fluid under pressure is vented in applying the brakes, and means operative to prevent back flow of fluid from one of said chambers to the other when said triple valve device is in brake releasing position and said pressure retaining valve device is in pressure retaining position.

15. In a fluid pressure brake, the combination with a brake pipe, a brake cylinder and a brake controlling valve device operated upon a reduction in brake pipe pressure for supplying fluid under pressure to the brake cylinder and operated upon an increase in brake pipe pressure for releasing fluid under pressure from the brake cylinder, of a plurality of chambers into which fluid under pressure is vented from the brake pipe in applying the brakes, and means operative upon the entire release of fluid under pressure in one of said chambers in releasing the brakes for venting fluid under pressure from the other of said chambers and operative to prevent the back flow of fluid from said other chamber to the first mentioned chamber when pressure is retained in the first mentioned chamber.

16. In a fluid pressure brake, in combination, a brake pipe, a brake cylinder, a triple valve device operated upon a reduction in brake pipe pressure to service application position in which fluid under pressure is supplied to the brake cylinder, two chambers, means operative in the service application position of the triple valve device for venting fluid under pressure from the brake pipe to one of said chambers at a certain rate, and means operative in the service position of the triple valve device for venting fluid under pressure from the brake pipe to the other of said chambers at a slower rate.

17. In a fluid pressure brake, in combination, a brake pipe, a brake cylinder, a triple valve device operated upon a reduction in brake pipe pressure to service application position in which fluid under pressure is supplied to the brake cylinder and having a service lap position in which the supply of fluid under pressure to the brake cylinder is cut off, two chambers, means operative in the service application position of the triple valve device for venting fluid under pressure from the brake pipe to one of said chambers at a certain rate, means operative in the service application position of the triple valve device for venting fluid under pressure from the brake pipe to the other of said chambers at a slower rate, and means operative in service lap position of the triple valve device for venting fluid under pressure from the first mentioned chamber.

18. In a fluid pressure brake, in combination, a brake pipe, a brake cylinder, a triple valve device operated upon a reduction in brake pipe pressure to service application position in which fluid under pressure is supplied to the brake cylinder, two chambers, means operative in the service application position of the triple valve device for venting fluid under pressure from the brake pipe to one of said chambers at a certain rate, and means operative in the service position of the triple valve device for venting fluid under pressure from the brake pipe to the other of said chambers at a different rate to dampen pressure surges in the brake pipe.

19. In a fluid pressure brake, in combination, a brake pipe, a brake cylinder, a triple valve device comprising a main slide valve, a graduating valve having movement relative to the main valve, and a piston operated upon a reduction in brake pipe pressure for moving said valves to service application position in which fluid under pressure is supplied to the brake cylinder and having a service lap position in which the supply of fluid to the brake cylinder is cut off, means included in the main slide valve adapted in service application position to establish communication through which fluid under pressure is vented from the brake pipe to one of said chambers, and means included in the main slide valve and graduating valve adapted in service application position to establish communication through which fluid under pressure is vented from the brake pipe to the other of said chambers and for venting fluid from said other chamber in service lap position.

20. In a fluid pressure brake, a brake pipe, a brake cylinder, and a triple valve device comprising a main valve, a graduating valve having movement relative to the main valve, and a piston operated upon a reduction in brake pipe pressure for moving said valves to service application position in which fluid under pressure is supplied to the brake cylinder, said graduating valve being movable relative to the main slide valve to a service lap position in which the supply of fluid to the brake cylinder is cut off, and two chambers into which fluid under pressure is vented from the brake pipe in service application position of said valves, one only of said chambers being connected to the atmosphere upon movement of the graduating valve to service lap position.

21. In a fluid pressure brake, a brake pipe, a brake cylinder, and a triple valve device comprising a main valve, a graduating valve having movement relative to the main valve, and a piston operated upon a reduction in brake pipe pressure for moving said valves to service application position in which fluid under pressure is supplied to the brake cylinder, said graduating valve being movable relative to the main slide valve to a service lap position in which the supply of fluid to the brake cylinder is cut off, and two chambers into which fluid under pressure is vented from the brake pipe in service application position of said valves, one of said chambers and the brake cylinder in the release position of said valves being connected to the atmosphere through the same exhaust passage, and the other of said chambers being connected to the atmosphere through a different exhaust passage, said other chamber being connected to the atmosphere upon movement of the graduating valve to service lap position.

22. In a fluid pressure brake, a brake pipe, a brake cylinder, and a triple valve device comprising a main valve, a graduating valve having movement relative to the main valve, and a piston operated upon a reduction in brake pipe pressure for moving said valves to service application position in which fluid under pressure is supplied to the brake cylinder, said graduating valve being movable relative to the main slide valve to a service lap position in which the supply of fluid to the brake cylinder is cut off, and two chambers into which fluid under pressure is vented from the brake pipe in service application position of said valves, one of said chambers and the brake cylinder in the release position of said valves being connected to the atmosphere through the same exhaust passage, and the other of said chambers being connected to the atmosphere through a different exhaust passage, said other chamber being connected to the atmosphere through a passage other than the first mentioned passages upon movement of the graduating valve to service lap position.

23. In a fluid pressure brake, the combination with a brake pipe and a triple valve device comprising valve means and a piston operated upon a reduction in brake pipe pressure for operating said valve means to effect an application of the brakes and operated upon an increase in brake pipe pressure for operating said valve means to effect a release of the brakes, of two chambers into which fluid under pressure is vented from the brake pipe when said valve means is operated to effect an application of the brakes, and means operative under certain conditions when said valve means is in position to effect the release of the brakes for venting fluid under pressure from one of said chambers to the other and operative under other conditions for preventing the back flow of fluid from the first mentioned chamber to said other chamber.

24. In a fluid pressure brake, the combination with a brake pipe and a triple valve device comprising valve means and a piston operated upon a reduction in brake pipe pressure for operating said valve means to effect an application of the brakes and operated upon an increase in brake pipe pressure for operating said valve means to effect a release of the brakes, of two chambers into which fluid under pressure is vented from the brake pipe when said valve means is operated to effect an application of the brakes, fluid under pressure being released from one of said chambers when said valve means is in position to effect the release of the brakes, and means operative upon substantially the entire release of fluid under pressure from said chamber for establishing communication through which fluid under pressure is released from the other of said chambers.

25. In a fluid pressure brake, the combination with a brake pipe and a triple valve device comprising valve means and a piston operated upon a reduction in brake pipe pressure for operating said valve means to effect an application of the brakes and operated upon an increase in brake pipe pressure for operating said valve means to effect a release of the brakes, of two chambers into which fluid under pressure is vented from the brake pipe when said valve means is operated to effect an application of the brakes, fluid under pressure being released from one of said chambers when said valve means is in position to effect the release of the brakes, and means operative upon substantially the entire release of fluid under pressure from said chamber for establishing communication through which fluid under pressure is released from the other of said chambers, and operative upon the retention of pressure in the first mentioned chamber for maintaining said communication closed.

26. In a fluid pressure brake, the combination with a brake pipe and a triple valve device comprising valve means and a piston operated upon a reduction in brake pipe pressure for operating said valve means to effect an application of the brakes and operated upon an increase in brake pipe pressure for operating said valve means to effect a release of the brakes, of two chambers into which fluid under pressure is vented from the brake pipe when said valve means is operated to effect an application of the brakes, fluid under pressure being released from one of said chambers when said valve means is in position to effect the release of the brakes, and means preventing back flow of fluid from the other of said chambers to the first mentioned chamber and operative upon a predetermined reduction in the pressure of fluid in the first mentioned chamber for establishing communication through which fluid under pressure flows from said other chamber to the first mentioned chamber.

27. In a fluid pressure brake, the combination with a brake pipe and a triple valve device comprising valve means and a piston operated upon a reduction in brake pipe pressure for operating said valve means to effect an application of the brakes and operated upon an increase in brake pipe pressure for operating said valve means to effect a release of the brakes, of two chambers into which fluid under pressure is vented from the brake pipe when said valve means is operated to effect an application of the brakes, fluid under pressure being released from one of said chambers when said valve means is in position to effect the release of the brakes, and means preventing back flow of fluid from the other of said chambers to the first mentioned chamber and operative in accordance with the pressure of fluid in the first mentioned chamber for establishing communication from said other chamber to the first mentioned chamber or for maintaining said communication closed.

CLYDE C. FARMER.